US011272390B2

(12) United States Patent
Takeda et al.

(10) Patent No.: US 11,272,390 B2
(45) Date of Patent: Mar. 8, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Huiling Li, Beijing (CN); Lihui Wang, Beijing (CN); Chongning Na, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/969,074

(22) PCT Filed: Feb. 14, 2018

(86) PCT No.: PCT/JP2018/005001
§ 371 (c)(1),
(2) Date: Aug. 11, 2020

(87) PCT Pub. No.: WO2019/159243
PCT Pub. Date: Aug. 22, 2019

(65) Prior Publication Data
US 2021/0037406 A1     Feb. 4, 2021

(51) Int. Cl.
*H04W 24/10* (2009.01)
*H04W 28/04* (2009.01)
*H04W 72/04* (2009.01)

(52) U.S. Cl.
CPC ........... *H04W 24/10* (2013.01); *H04W 28/04* (2013.01); *H04W 72/0413* (2013.01)

(58) Field of Classification Search
CPC .............................. H04W 28/04; H04W 24/10
USPC ....................................................... 370/329
See application file for complete search history.

(56) References Cited

FOREIGN PATENT DOCUMENTS

JP     2011166834 A     8/2011

OTHER PUBLICATIONS

3GPP TS 36.300 V8.12.0 "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)" Mar. 2010 (149 pages).
3GPP TSG RAN WG1 #88 Meeting; R1-1701681 "Independent and joint control of CSI-RS transmission and CSI reporting for NR MIMO" Huawei, HiSilicon; Athens, Greece; Feb. 13-17, 2017 (7 pages).
International Search Report issued in International Application No. PCT/JP2018/005001; dated Apr. 10, 2018 (5 pages).
Written Opinion issued in International Application No. PCT/JP2018/005001; dated Apr. 10, 2018 (4 pages).

(Continued)

*Primary Examiner* — Angel T Brockman
(74) *Attorney, Agent, or Firm* — Osha Bergman Watanabe & Burton LLP

(57) ABSTRACT

A user terminal according to one aspect of the present disclosure includes a receiving section that receives information indicating start of report of semi-persistent channel state information (SP-CSI (Semi-Persistent Channel State Information) report), and a control section that determines timing of the SP-CSI report, based on whether or not there is relation between timing of a feedback report for reception of the information and the timing of the SP-CSI report. According to one aspect of the present disclosure, SP-CSI report and/or detection can be appropriately controlled even when SP-CSI report activation is indicated by using MAC CEs (Medium Access Control Control Elements).

4 Claims, 8 Drawing Sheets

(56) References Cited

OTHER PUBLICATIONS

3GPP TSG RAN WG1 Meeting 90bis; R1-1718443 "On aperiodic and semi-persistent CSI reporting on PUCCH" Ericsson; Prague, CZ; Oct. 9-13, 2017 (3 pages).
3GPP TSG RAN WG1 Meeting 90bis; R1-1718432 "On remaining details of CSI reporting" Ericsson; Prague, CZ Oct. 9-13, 2017 (15 pages).
3GPP TSG-RAN WG1 #86bis; R1-1609971 "Discussion on activation and release mechanism for beamformed CSI-RS" Qualcomm Incorporated; Lisbon, Portugal; Oct. 10-14, 2016 (2 pages).
3GPP TSG-RAN WG2 Meeting #98; R2-1704228 "Beam management" CATT; Hangzhou, China; May 15-19, 2017 (4 pages).
3GPP TSG RAN WG1 Meeting AH 1801; R1-1800109 "Remaining details on CSI reporting" ZTE, Sanechips Vancouver, Canada; Jan. 22-26, 2018 (5 pages).
Extended European Search Report issued in European Application No. 18906184.9, dated Aug. 23, 2021 (11 pages.

USER TERMINAL AND RADIO COMMUNICATION METHOD

TECHNICAL FIELD

The present disclosure relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 14," "LTE Rel. 15" (or later versions), and so on) are also under study.

In existing LTE systems (for example, LTE Rel. 8 to Rel. 13), a user terminal (UE (User Equipment)) periodically and/or aperiodically transmits channel state information (CSI) to a base station. The UE transmits the CSI by using an uplink control channel (PUCCH (Physical Uplink Control Channel)) and/or an uplink shared channel (PUSCH (Physical Uplink Shared Channel)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), a CSI report using a configuration different from the configuration of the existing LTE systems (for example, LTE Rel. 13 or earlier versions) is under study.

For example, an SP-CSI (Semi-Persistent CSI) report, in which a UE reports CSI by using a semi-persistently specified resource, is under study.

Further, controlling activation of the SP-CSI report by using a MAC CE (Medium Access Control Control Element) is under study. However, it is assumed that a time period from when the UE receives a MAC CE to when an SP-CSI report is actually enabled depends on performance of the UE. For this reason, at which timing transmission of an SP-CSI report should be started after the UE receives a MAC CE etc. need to be appropriately determined. Otherwise, for example, throughput may be deteriorated, which has been posing a problem.

In view of this, the present disclosure has one object to provide a user terminal and a radio communication method that enable appropriate control of SP-CSI report and/or detection even when SP-CSI report activation is indicated by using a MAC CE.

Solution to Problem

A user terminal according to one aspect of the present disclosure includes a receiving section that receives information indicating start of report of semi-persistent channel state information (SP-CSI (Semi-Persistent Channel State Information) report), and a control section that determines timing of the SP-CSI report, based on whether or not there is relation between timing of a feedback report for reception of the information and the timing of the SP-CSI report.

Advantageous Effects of Invention

According to one aspect of the present disclosure, SP-CSI report and/or detection can be appropriately controlled even when SP-CSI report activation is indicated by using a MAC CE.

DESCRIPTION OF EMBODIMENTS

Figure 1:
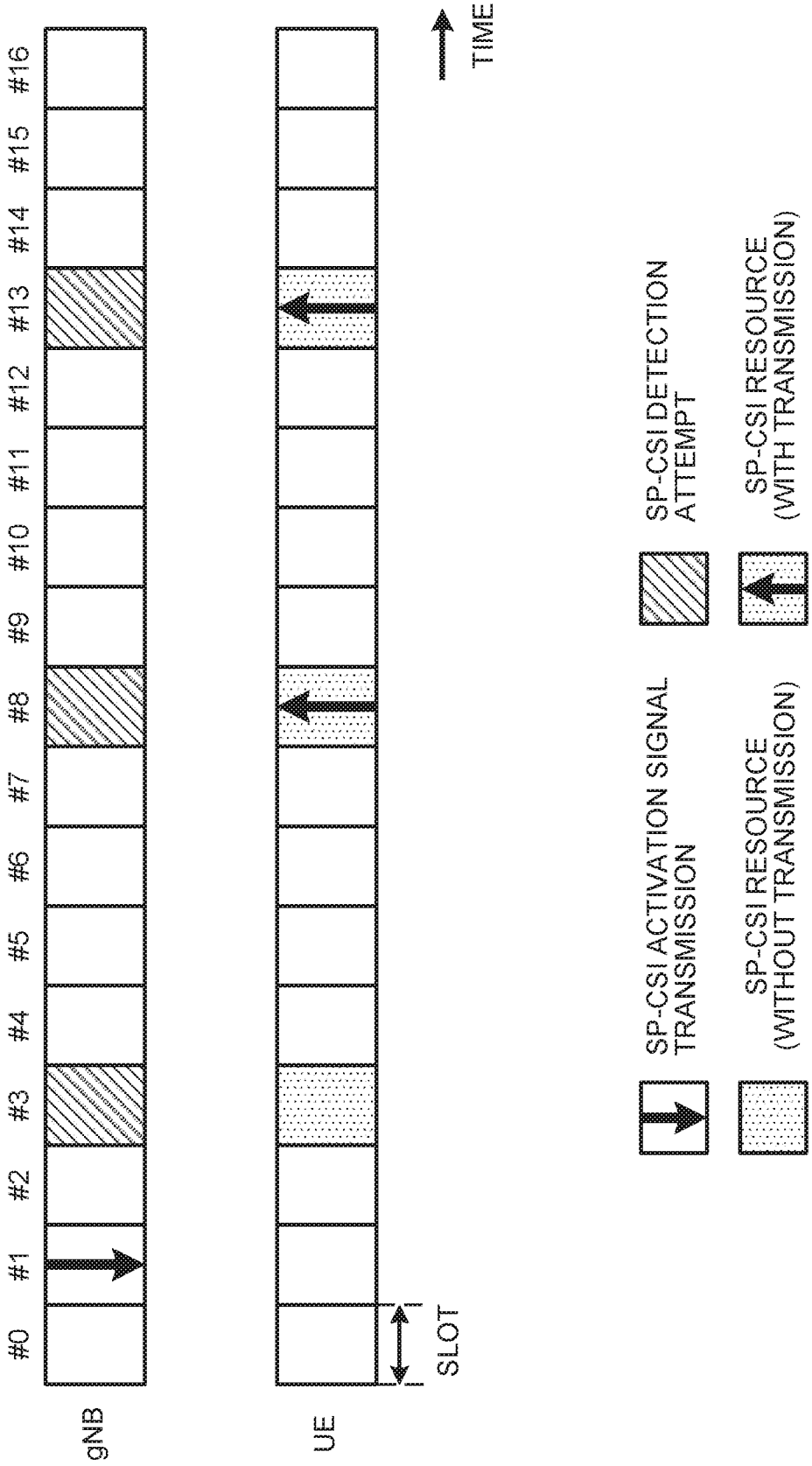
FIG. 1 is a diagram to show an example of operations of a gNB and a UE according to Embodiment 1.1.

In NR, a reference signal for measuring a channel state in a downlink is under study. The reference signal for channel state measurement may be a signal referred to as a CRS (Cell-specific Reference Signal), a CSI-RS (Channel State Information-Reference Signal), or the like.

A UE feeds back (reports) results of measurement based on the reference signal for channel state measurement as channel state information (CSI) to a radio base station (which may be referred to as, for example, a BS (Base Station), a transmission/reception point (TRP), an eNB (eNode3), a gNB (NR NodeB), or the like) at certain timing. The CSI may include a CQI (Channel Quality Indicator), a PMI (Precoding Matrix Indicator), an RI (Rank Indicator), or the like.

As methods of feeding back the CSI, for example, the following methods are under study: (1) a periodic CSI (P-CSI) report, (2) an aperiodic CSI (A-CSI) report, and (3) a semi-persistent CSI report (SP-CSI) report.

Once a resource for SP-CSI report (which may be referred to as an SP-CSI resource) is specified, the UE can periodically use the resource based on the specification unless release (or deactivation) of the SP-CSI resource is specially specified.

The SP-CSI resource may be a resource configured by using higher layer signaling, or may be a resource specified by using an activation signal (which may be referred to as a "trigger signal") of the SP-CSI report.

Here, for example, the higher layer signaling may be any one or combinations of RRC (Radio Resource Control) signaling, MAC (Medium Access Control) signaling, broadcast information, and the like.

For example, the MAC signaling may use MAC control elements (MAC CEs), MAC PDUs (Protocol Data Units), and the like. For example, the broadcast information may be master information blocks (MIBs), system information blocks (SIBs), minimum system information (RMSI (Remaining Minimum System Information)), and the like.

Information of the SF-CSI resource may include, for example, information related to report periodicity (ReportPeriodicity) and an offset (ReportSlotOffset), and these may be expressed in the unit of slot, the unit of subframe, or the like. The information of the SP-CSI resource may include a configuration ID (CSI-ReportConfigId). With the configuration ID, a type of a CSI report method (for example, whether or not SP-CSI is used), parameters of report periodicity, or the like may be identified. The information of the SP-CSI resource may be referred to as an SP-CSI resource configuration, an SP-CSI report configuration, or the like.

When the UE receives a certain activation signal, for example, the UE can periodically perform CSI measurement using a certain reference signal (which may be referred to as, for example, an SP-CSI-RS) and/or SP-CSI report using an SP-CSI resource. When the UE receives a certain deactivation signal or when a certain timer expires, the UE stops the SP-CSI measurement and/or report.

The SP-CSI report may be transmitted by using a primary cell (PCell), a primary secondary cell (PSCell), a PUCCH secondary cell (PUCCH SCell), other cells (for example, a secondary cell), or the like.

An activation/deactivation signal of the SP-CSI report may be, for example, reported by using MAC signaling (for example, a MAC CE), or may be reported by using physical layer signaling (for example, downlink control information (DCI)).

Note that the SP-CSI report may be transmitted by using either one or both of a PUCCH and a PUSCH. Information as to which of a PUCCH or a PUSCH is used for transmission may be configured from the gNB to the UE by using RRC signaling, may be specified by using a MAC CE or the like, or may be reported by using DCI.

A channel for performing the SP-CSI report may be determined based on an activation signal of the SP-CSI report. For example, the SP-CSI report using the PUCCH may be activated by a MAC CE, and the SP-CSI report using the PUCSH may be triggered by DCI.

The DCI may be DCI having its cyclic redundancy check (CRC) bits masked with a radio network temporary identifier (RNTI) for SP-CSI report.

When a plurality of SP-CSI resources are configured for the UE, the activation signal of the SP-CSI report may include information indicating one of the plurality of SP-CSI resources. In this case, the UE can determine a resource to be used for the SP-CSI report, based on the activation signal of the SP-CSI report.

The UE may transmit a feedback in response to reception of a certain activation/deactivation signal. The feedback may be a confirmation response (ACK (Acknowledgement)). For example, when a certain activation/deactivation signal is transmitted by using a MAC CE, the MAC CE is transmitted on the PDSCH. Thus, the feedback may be a HARQ feedback (for example, an ACK, a NACK (Negative ACK), or a DTX (Discontinuous Transmission)) for the PDSCH.

As described above, in NR, controlling SP-CSI report activation by using a MAC CE is under study. However, it is assumed that a time period from when the UE receives a MAC CE to when an SP-CSI report is actually enabled depends on performance of the UE. For this reason, at which timing transmission of an SP-CSI report is to be started after the UE receives a MAC CE, or primarily, which timing is to be used as a reference for timing of an SP-CSI resource, and the like, need to be appropriately determined. Otherwise, for example, throughput may be deteriorated, which has been posing a problem.

In view of this, the inventors of the present invention came up with the idea of a method for appropriately performing SP-CSI report and/or detection even when SP-CSI report activation is reported by using a MAC CE.

Embodiments according to the present disclosure will be described in detail with reference to the drawings as follows. The radio communication method according to each embodiment may be employed independently or may be employed in combination.

Note that the "SP-CSI resource" as used in description of this specification may be interpreted as a "PUCCH resource for SP-CSI report", and may be one or a plurality of PUCCH resources indicated by an activation signal. "To detect an SP-CSI resource" may be interpreted as "to detect an SP-CSI report using an SP-CSI resource".

The expression "(being) configured" in reference to an SP-CSI resource (SP-CSI report) may mean "(being) activated among configured resource configurations".

The unit of a time resource is not limited to a slot, and may be interpreted as a mini-slot, a sub-slot, a symbol, a subframe, or the like.

In the following, for the sake of simplicity, the MAC CE for SP-CSI report activation is also simply referred to as "MAC CE". The HARQ feedback (for example, an ACK, a NACK, or a DTX) for the MAC CE is also simply referred to as a "feedback". Note that the "MAC CE" may be interpreted as other signaling (RRC signaling, DCI, or the like).

Radio Communication Method

First Embodiment

In a first embodiment, the UE determines transmission timing of an SP-CSI report, only based on a configuration of higher layer signaling (for example, RRC signaling).

Regarding transmission timing of an SP-CSI report in the UE and/or detection timing of the report in the gNB, it may be assumed that there is no particular limitation (Embodiment 1.1), or it may be assumed that there is a limitation (Embodiment 1.2).

Embodiment 1.1

When the gNB transmits a MAC CE, the gNB may start blind detection from the most recent resource out of PUCCH resources for SP-CSI configured in advance. Note that the blind detection may mean monitoring of PUCCH resource candidates (a set of configured resources) and determining whether or not a PUCCH resource is to be transmitted based on interrelated detection results between a PUCCH resource to be transmitted and a received signal, may mean performing error correction decoding and/or CRC decoding on CSI included in the PUCCH resource to be transmitted, or may mean detecting by means of a combination of these.

The gNB may perform the blind detection before receiving a feedback for the MAC CE. The gNB may perform the blind detection in the same TTI as that for transmission of the MAC CE.

When the UE receives the MAC CE, the UE may transmit an SP-CSI report by using a PUCCH resource that is closest to (that is immediately after) the earliest timing at which processing for transmission of the SP-CSI report are completed out of PUCCH resources configured in advance. The UE may transmit the SP-CSI report before transmitting a feedback for the MAC CE. The UE may transmit the SP-CSI report in the same TTI as that for reception of the MAC CE.

A time period for completion of the processing for transmission of the SP-CSI report may include a time period for decoding of the received MAC CE and a time period for the processing for transmission of the SP-CSI report (signal generation, coding, and the like). A time period for completion of the processing for transmission may be determined based on processing capability of the UE, and the UE may complete completion of the processing for transmission within a certain time period.

In Embodiment 1.1, a feedback for the MAC CE may not be transmitted. The gNB may assume that an ACK is fed back from the UE when the gNB first receives the SP-CSI report from the UE.

FIG. 1 is a diagram to show an example of operations of the gNB and the UE according to Embodiment 1.1. The present example shows operations performed in the unit of slots. However, the unit of operations may be expressed in other TTIs (Transmission Time Intervals).

In the present example, it is assumed that SP-CSI report periodicity (ReportPeriodicity)=5 slots and an offset related to an SP-CSI report (ReportSlotOffset)=3 slots are configured for the UE. Note that the values of the configuration are merely an example, and are not limited to the above values. It is assumed that the offset is an offset with respect to the first TTI (for example, slot #0, subframe #0, frame #0, symbol #0, or the like) in a certain period.

In the present example, an example in which the gNB transmits a MAC CE for SP-CSI activation to the UE in slot #1 will be described.

After transmitting the MAC CE, the gNB attempts detecting an SP-CSI report (PUCCH including the SP-CSI report) in slot #3 that includes the PUCCH resources for SP-CSI configured for the UE.

The UE has received the MAC CE but has not yet completed processing for transmission of the SP-CSI report. Accordingly, the UE does not transmit the SP-CSI by using the SP-CSI resource of slot #3.

Moreover, in the present example, it is assumed that the UE completes the processing for transmission of the SP-CSI report before slot #8. The UE transmits the SP-CSI to the gNB by using the SP-CSI resource of slot #8, which is a slot, report periodicity (5 slots) after slot #3 being the most recent SP-CSI resource since the timing at which the processing for transmission are completed.

The gNB can attempt detecting SP-CSI and receive the SP-CSI in slot #8 that includes the PUCCH resources for SP-CSI configured for the UE.

From this time point until a deactivation signal is reported to the UE, the UE can perform the SP-CSI report and the gNB can perform detection of the SP-CSI report in slots according to the report periodicity.

Note that the UE may report information related to a time period from reception of a MAC CE to completion of processing for transmission of an SP-CSI report to the gNB. The information may be included in UE capability information (UE Capability). The UE may perform control assuming that the UE need not necessarily or is not allowed to start an SP-CSI report before time that is reported using the UE capability information after reception of the MAC CE.

After transmitting the MAC CE, the gNB that has received the report of the information can perform control so as to perform blind detection of SP-CSI from the PUCCH resource with which the UE may transmit the SP-CSI report at the earliest, based on the information. As a result, unnecessary blind detection can be prevented.

Embodiment 1.2

When the gNB transmits a MAC CE and receives an ACK (HARQ-ACK) for the MAC CE, the gNB may start blind detection from the most recent resource out of PUCCH resources for SP-CSI configured in advance. When the gNB transmits a MAC CE and does not receive an ACK for the MAC CE (or receives a NACK or detects a DTX), the gNB need not perform detection of the SP-CSI resource.

Differences from Embodiment 1.1 will mainly be described below. Configurations similar to those of Embodiment 1.1 may be adopted for configurations not described herein. For example, the UE and/or the gNB may assume that the offset related to the SP-CSI report is an offset with respect to the first TTI (for example, slot #0, subframe #0, frame #0, symbol #0, or the like) in a certain period.

When the UE receives a MAC CE and transmits an ACK for the MAC CE, the UE may transmit an SP-CSI report.

The UE may transmit a feedback (ACK, NACK, or the like) for the MAC CE by using a PUCCH resource for HARQ-ACK.

The UE may receive a report of information related to the PUCCH resource for HARQ-ACK (for example, a time cycle, a time offset, a PRB index, a frequency offset, or the like) from the gNB by using higher layer signaling (for example, RRC signaling) or physical layer signaling (for example, DCI), or by using a combination of these.

Here, when transmission timing of an ACK for a MAC CE and transmission timing of an SP-CSI report overlap (collide) with each other, the UE may control the transmission, based on assumption of at least one of the following (1) to (3):

(1) When the PUCCH resource for HARQ-ACK is large enough to include one or a plurality of SP-CSI reports, the PUCCH resource for HARQ-ACK is used for transmission of the SP-CSI report (the SP-CSI is multiplexed on the ACK). Otherwise, the SP-CSI is dropped, and the next available SP-CSI resource is used for transmission of the SP-CSI report (in other words, transmission of the SP-CSI report is delayed);

(2) When simultaneous transmission of the CSI report and the HARQ-ACK is enabled (or configured), the SP-CSI resource is used for transmission of the ACK for the MAC CE (ACK is multiplexed on the SP-CSI);

(3) When simultaneous transmission of the CSI report and the HARQ-ACK is disabled (or not configured), the SP-CSI report is dropped. In this case, the PUCCH resource for HARQ-ACK is used for transmission of the ACK for the MAC CE. The PUCCH resource may be a resource indicated by DCI, and the DCI may be, for example, DCI indicating reception of a MAC CE.

When transmission timing of an ACK for a MAC CE and transmission timing of an SP-CSI report overlap (collide) with each other in the user terminal; the gNB may control the reception, based on assumption of at least one of the following (1) to (3):

(1) If the PUCCH resource for HARQ-ACK is large enough to include one or a plurality of SP-CSI reports, the PUCCH resource for HARQ-ACK is used for transmission of the SP-CSI report (the SP-CSI is multiplexed on the ACK). Otherwise, the SP-CSI is dropped, and the next available SP-CSI resource is used for transmission of the SP-CSI report.

(2) If simultaneous transmission of the CSI report and the HARQ-ACK is configured to be enabled for the user terminal, the SP-CSI resource is used for transmission of the ACK for the MAC CE (ACK is multiplexed on the SP-CSI).

(3) If simultaneous transmission of the CSI report and the HARQ-ACK is configured to be disabled for the user terminal, the SP-CSI report is dropped. In this case, the PUCCH resource for HARQ-ACK is used for transmission of the ACK for the MAC CE. The PUCCH resource may be a resource indicated by DCI, and the DCI may be, for example, DCI indicating reception of a MAC CE.

Note that the UE may receive a report of information as to whether or not simultaneous transmission of the CSI report and the HARQ-ACK is enabled from the gNB by using higher layer signaling (for example, RRC signaling) or physical layer signaling (for example, DCI), or by using a combination of these.

The UE may omit transmission of the ACK for the MAC CE by transmitting the SP-CSI report. The gNB may assume that the ACK is fed back from the UE when the gNB first receives the SP-CSI report from the UE.

After the UE transmits the ACK and the gNB receives the ACK, the UE can perform the SP-CSI report and the gNB can perform detection of the SP-CSI report in slots according to the report periodicity, until a deactivation signal is reported to the UE.

According to the first embodiment described above, it can be assumed that the offset of the SP-CSI report configuration is an offset with respect to the first TTI (for example, slot #0) in a certain period. Therefore, SP-CSI report and/or detection can be appropriately performed without causing inconsistency regarding the SP-CSI resource between the UE and the gNB even when SP-CSI report activation is indicated by using a MAC CE.

Second Embodiment

In a second embodiment, the UE determines transmission timing of an SP-CSI report, based on configuration of higher layer signaling (for example, RRC signaling) and DCI (which may be referred to as, for example, DL assignment or the like) for scheduling reception of a MAC CE.

The UE receives DCI (PDCCH) for indicating reception of a MAC CE (PDSCH). The DCI includes information related to transmission timing of a feedback for the MAC CE. The information may be referred to as timing indication for HARQ-ACK, K1, or the like. The timing indication for HARQ-ACK may be expressed in the unit of slot, for example.

When the gNB transmits a MAC CE and receives an ACK (HARQ-ACK) for the MAC CE, the gNB may start blind detection from a resource after a time offset of PUCCH resources for SP-CSI configured in advance, with respect to a slot in which the ACK is received. When the gNB does not receive an ACK (or receives a NACK or detects a DTX), the gNB need not perform detection of the SP-CSI resource.

In other words, the gNB may determine that timing obtained by adding an offset of SP-CSI resources configured by using higher layer signaling to timing (for example, a slot) at which the ACK (HARQ-ACK) for the MAC CE is received is the SP-CSI resource. From the timing, the gNB may start control of detecting an SP-CSI report by using configured transmission periodicity of SP-CSI resources.

After receiving the MAC CE, the UE determines timing for transmitting an ACK for the MAC CE, based on the timing indication for HARQ-ACK described above, and transmits the ACK to the gNB at the determined timing.

The UE may transmit a feedback (ACK, NACK, or the like) for the MAC CE by using a PUCCH resource for HARQ-ACK, in a similar manner to Embodiment 1.2.

After transmitting the ACK for the MAC CE, the UE may transmit the SP-CSI report in the most recent PUCCH resource after the time offset of PUCCH resources for SP-CSI configured in advance with respect to the slot in which the ACK is received.

In other words, the UE may determine that timing obtained by adding an offset of SP-CSI resources configured by using higher layer signaling to timing (for example, a slot) at which the ACK (HARQ-ACK) for the MAC CE is transmitted is the SP-CSI resource. From the timing, the UE may start control of transmitting an SP-CSI report by using configured transmission periodicity of SP-CSI resources.

In short, in the second embodiment, the offset (ReportSlotOffset) of the SP-CSI resource configured by using higher layer signaling may mean an offset with respect to timing at which an ACK for a MAC CE for SP-CSI report activation is transmitted and/or received (or timing derived based on the timing), instead of meaning an offset with respect to the first TTI (for example, slot #0, subframe #0, frame #0, symbol #0, or the like) in a certain period.

Note that the timing indication for HARQ-ACK may indicate a period from reception timing of a MAC CE to timing of transmitting a HARQ-ACK for the MAC CE, or may indicate a period from reception timing of DCI for indicating reception of a MAC CE to timing of transmitting the HARQ-ACK.

Figure 2:
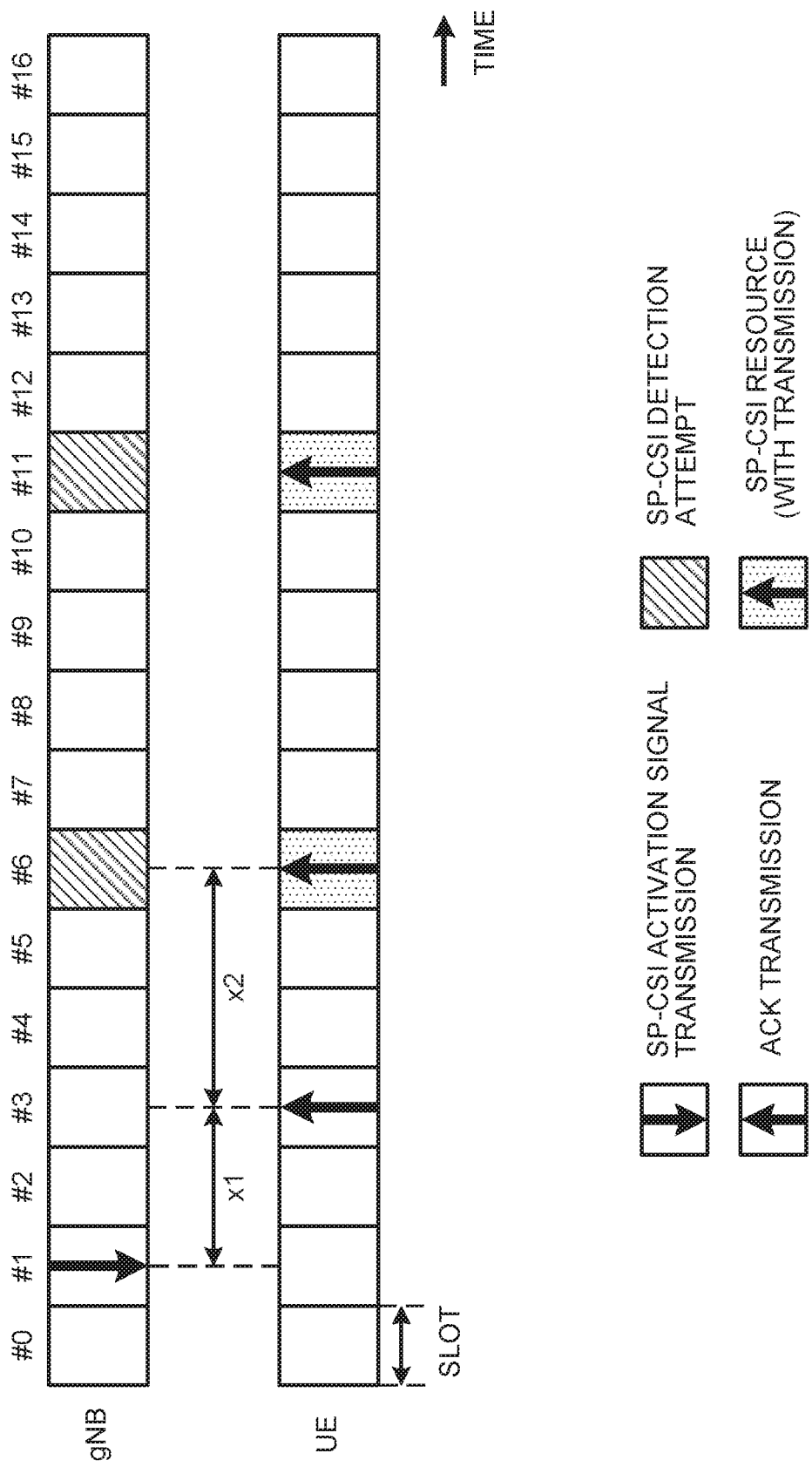
FIG. 2 is a diagram to show an example of operations of a gNB and a UE according to a second embodiment.

FIG. 2 is a diagram to show an example of operations of the gNB and the UE according to the second embodiment. The present example shows operations performed in the unit of slots. However, the unit of operations may be expressed in other TTIs.

In the present example, in a similar manner to FIG. 1, it is assumed that SP-CSI report periodicity (ReportPeriodicity)=5 slots and an offset related to an SP-CSI report (ReportSlotOffset)=3 slots (represented by x2 in FIG. 2) are configured for the UE.

In the present example, an example in which the gNB transmits a MAC CE for SP-CSI activation zo the UE in slot #1 will be described.

For example, in slot #1, the gNB includes timing indication for HARQ-ACK in DCI for scheduling the PDSCH including the MAC CE to transmit the timing indication for HARQ-ACK. In the case of the present example, it is assumed that timing indication for HARQ-ACK=2 slots (represented by x1 in FIG. 2) is reported. Note that, instead of the same slot for the MAC CE, the DCI may be transmitted in another slot (for example, slot #0).

The UE transmits an ACK to the gNB at timing (slot #3) that is indicated by the timing indication for HARQ-ACK with respect to the timing (slot #1) at which the MAC CE is received.

After transmitting the ACK, the UE transmits SP-CSI to the gNB by using the SP-CSI resource of timing (slot #6) after the elapse of the configured offset related to the SP-CSI report (=slot 3).

At the timing (slot #6) after the elapse of x1+x2 (=5 slots) from the transmission timing of the MAC CE, the gNB can attempt detecting SP-CSI report (PUCCH including the SP-CSI report) and receive the SP-CSI.

From this time point until a deactivation signal is reported to the UE, the UE can perform the SP-CSI report and the gNB can perform detection of the SP-CSI report in slots according to the report periodicity.

According to the second embodiment described above, it can be assumed that the offset of the SP-CSI report configuration is an offset of timing at which an ACK for a MAC CE for SP-CSI report activation is transmitted and/or received. Therefore, SP-CSI report and/or detection can be appropriately performed without causing inconsistency regarding the SP-CSI resource between the UE and the gNB even when SP-CSI report activation is indicated by using a MAC CE.

Radio Communication System

Hereinafter, a structure of a radio communication system according to one embodiment of the present disclosure will be described. In this radio communication system, the radio communication method according to each embodiment of the present disclosure described above may be used alone or may be used in combination for communication.

Figure 3:
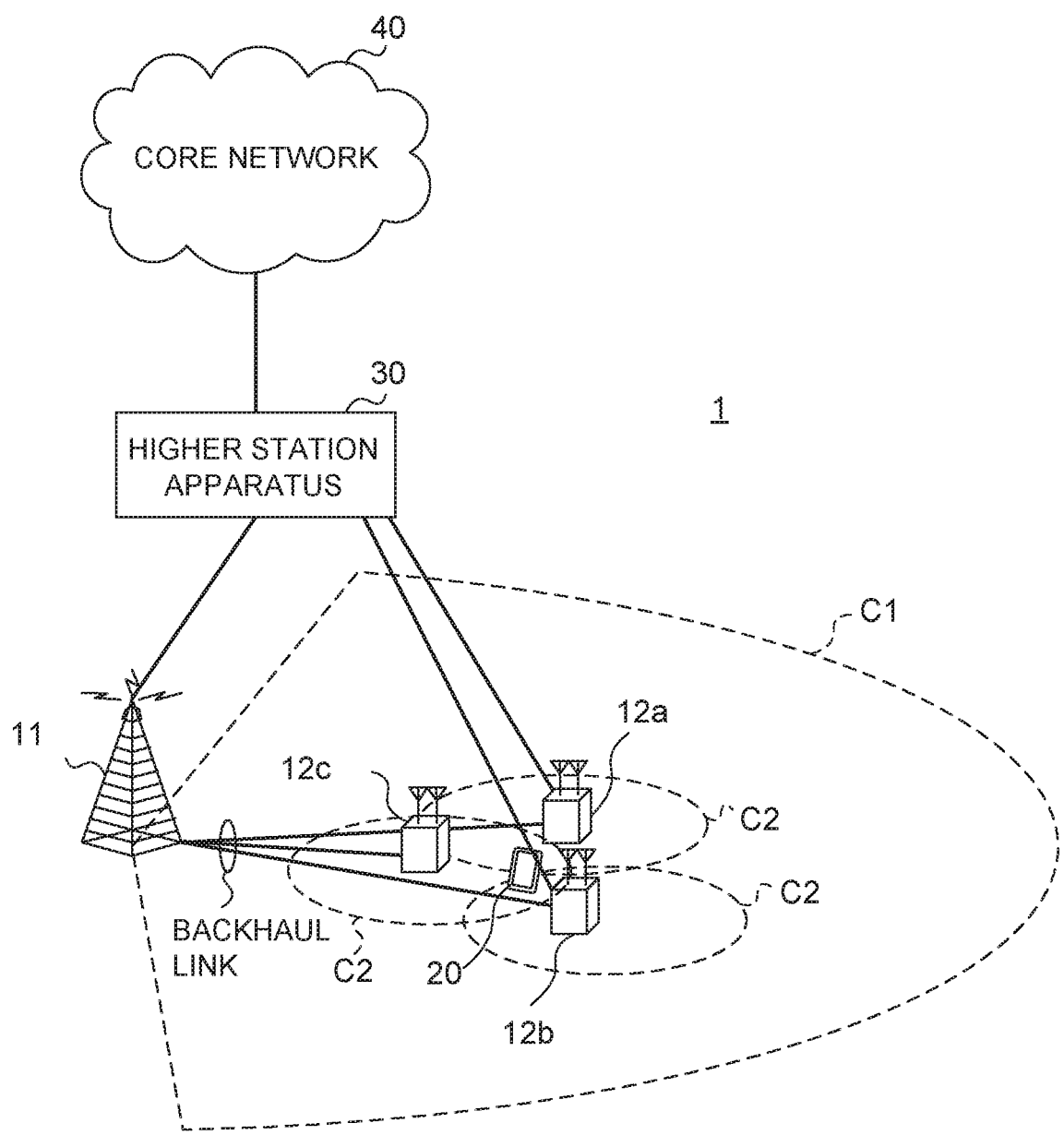
FIG. 3 is a diagram to show an example of a schematic structure of a radio communication system according to one embodiment.

FIG. 3 is a diagram to show an example of a schematic structure of the radio communication system according to one embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on. For example, if certain physical channels use different subcarrier spacings of the OFDM symbols constituted and/or different numbers of the OFDM symbols, it may be referred to as that the numerologies are different.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRKs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/HACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

Radio Base Station

Figure 4:
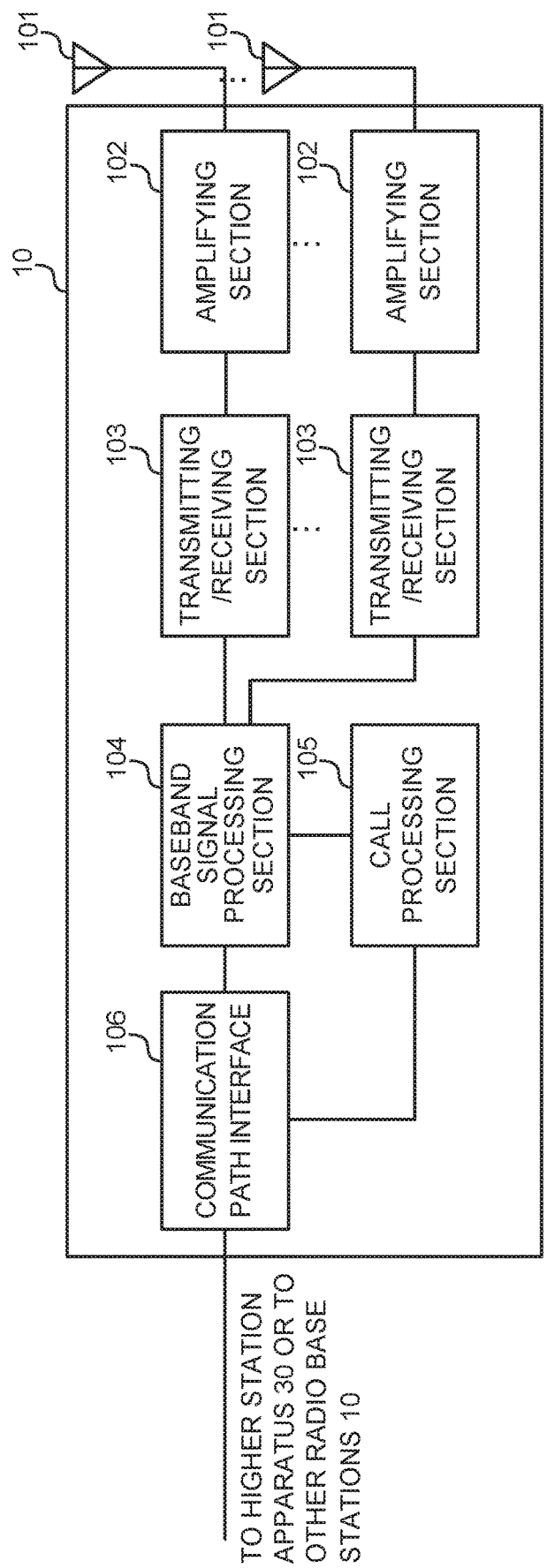
FIG. 4 is a diagram to show an example of an overall structure of a radio base station according to one embodiment.

FIG. 4 is a diagram to show an example of an overall structure of the radio base station according to one embodiment. A radio base station 10 includes a plurality of transmitting/receiving antennas 101, amplifying sections 102, transmitting/receiving sections 103, a baseband signal processing section 104, a call processing section 105, and a transmission line interface 106. Note that the radio base station 10 may be configured to include one or more transmitting/receiving antennas 101, one or more amplifying sections 102, and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 may receive channel state information (SP-CSI) transmitted from the user terminal 20 by using a semi-persistently specified resource. The transmitting/receiving sections 103 may transmit a transmission indication (UL grant) to the user terminal 20.

The transmitting/receiving sections 103 may transmit information related to an SP-CSI report and priority of ULGF transmission or the like to the user terminal 20.

Figure 5:
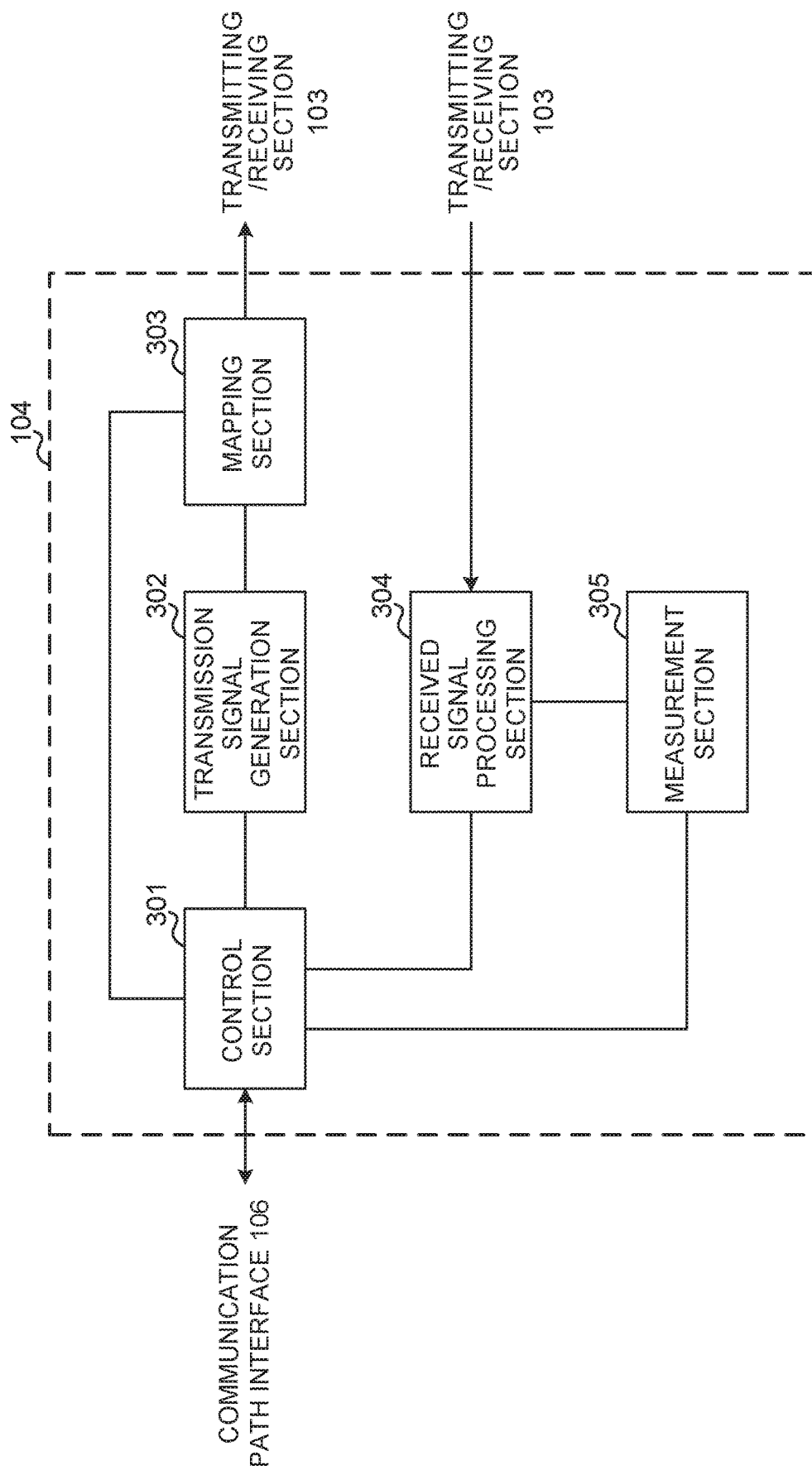
FIG. 5 is a diagram to show an example of a functional structure of the radio base station according to one embodiment.

FIG. 5 is a diagram to show an example of a functional structure of the radio base station according to one embodiment. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH, transmission confirmation information, and so on). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls the scheduling of an uplink data signal (for example, a signal transmitted on the PUSCH), an uplink control signal (for example, a signal transmitted on the PUCCH and/or the PUSCH, transmission confirmation information, and so on), a random access preamble (for example, a signal transmitted on the PRACH), an uplink reference signal, or the like.

The control section 301 may control receiving processes (for example, decoding or the like) in a period including a semi-persistently specified resource (SP-CSI resource). The control section 301 may control generation and transmission of information (for example, a MAC CE for SP-CSI report activation) indicating start of a report of semi-persistent channel state information (SP-CSI report).

For example, based on whether or not there is relation between first timing (which may be referred to as first reception timing) being timing (for example, reception timing) of a feedback report according to the information (feedback report reported by the user terminal 20 according to the information) and second timing (which may be referred to as second reception timing) being timing (for example, reception timing) of the SP-CSI report, the control section 301 may determine (identify) the second timing.

The control section 301 may assume that there is no relation between the first timing and the second timing, and determine the second timing, regardless of the first timing.

The control section 301 may assume that there is relation between the first timing and the second timing, and determine the second timing, based on the first timing.

The control section 301 may determine that timing obtained by adding a timing offset (for example, an offset (ReportSlotOffset) included in SP-CSI configuration) related to the SP-CSI report configured for the user terminal 20 by using higher layer signaling (for example, RRC signaling) to the first timing is the second timing.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

User Terminal

Figure 6:
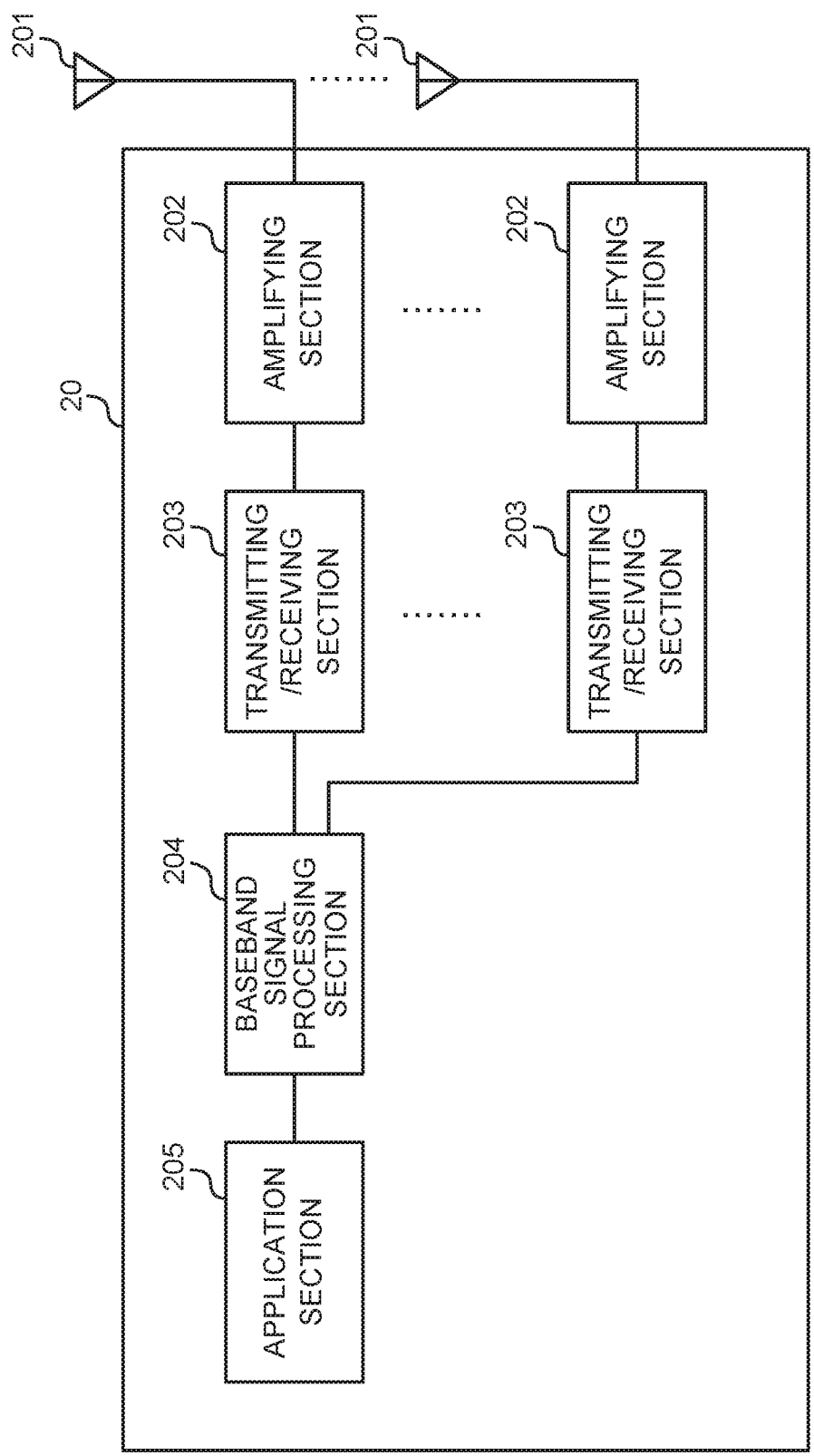
FIG. 6 is a diagram to show an example of an overall structure of a user terminal according to one embodiment.

FIG. 6 is a diagram to show an example of an overall structure of a user terminal according to one embodiment. A user terminal 20 includes a plurality of transmitting/receiving antennas 201, amplifying sections 202, transmitting/receiving sections 203, a baseband signal processing section 204, and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 may transmit channel state information (SP-CSI) by using a semi-persistently specified resource. The transmitting/receiving sections 203 may receive a transmission indication (UL grant) from the radio base station 10.

The transmitting/receiving sections 203 may receive information related to an SP-CSI report and priority of ULGF transmission or the like from the radio base station 10.

Figure 7:
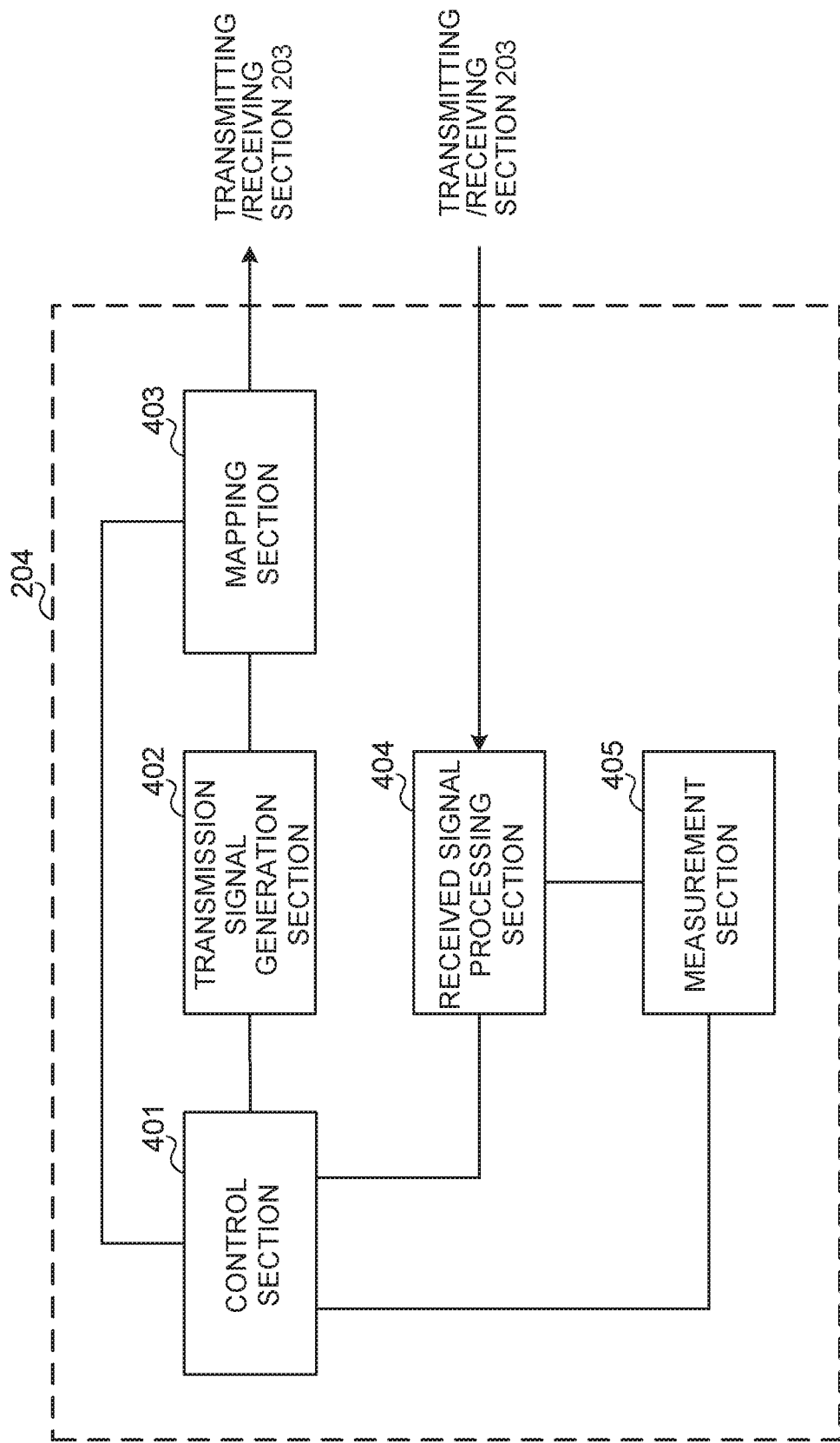
FIG. 7 is a diagram to show an example of a functional structure of the user terminal according to one embodiment.

FIG. 7 is a diagram to show an example of a functional structure of a user terminal according to one embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may acquire information (for example, a MAC CE for SP-CSI report activation) indicating start of a report of semi-persistent channel state information (SP-CSI report) from the received signal processing section 404, and may perform control related to the SP-CSI report.

Based on whether or not there is relation between first timing (which may be referred to as first transmission timing) being timing (for example, transmission timing) of a feedback report for reception of the information and second timing (which may be referred to as second transmission timing) being timing (for example, transmission timing) of the SP-CSI report, the control section 401 may determine (identify) the second timing.

The control section 401 may assume that there is no relation between the first timing and the second timing, and determine the second timing, regardless of the first timing.

The control section 401 may assume that there is relation between the first timing and the second timing, and determine the second timing, based on the first timing.

The control section 401 may determine that timing obtained by adding a timing offset (for example, an offset (ReportSlotOffset) included in SP-CSI configuration) related to the SP-CSI report configured by using higher layer signaling (for example, RRC signaling) to the first timing is the second timing.

Note that, in this specification, "transmission (or transmission timing) of the user terminal 20" may be interpreted as, for example, "reception (or transmission timing) of the radio base station 10".

If the control section 401 acquires a variety of information reported by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

Hardware Structure

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 8:
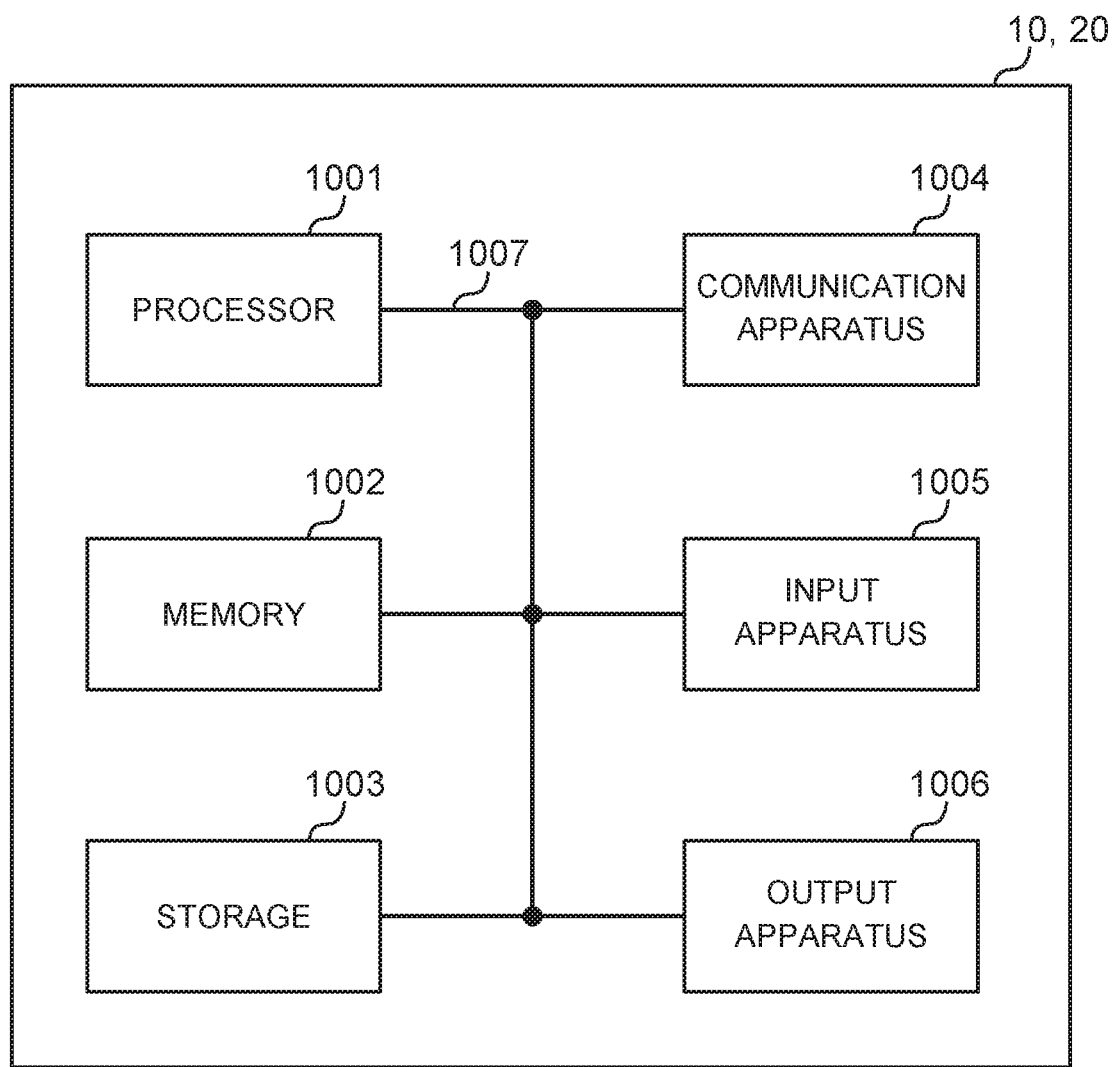
FIG. 8 is a diagram to show an example of a hardware structure of the radio base station and the user terminal according to one embodiment.

For example, a radio base station, a user terminal, and so on according to one embodiment of the present disclosure may function as a computer that executes the processes of the radio communication method of the present disclosure. FIG. 8 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control reading and/or writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and/or the like for implementing a radio communication method according to one embodiment.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on. Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

Variations

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control, information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present disclosure may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the invention according to the present disclosure has been described in detail above, it should be obvious to a person skilled in the art that the invention according to the present disclosure is by no means limited to the embodiments described in this specification. The invention according to the present disclosure can be implemented with various corrections and in various modifications, without departing from the spirit and scope of the invention defined by the recitations of claims. Consequently, the description in this specification is provided only for the purpose of explaining examples, and should by no means be construed to limit the invention according to the present disclosure in any way.

What is claimed is:

1. A terminal comprising:
   a receiving section that receives information indicating start of Semi-Persistent Channel State Information (SP-CSI) report; and
   a control section that control to transmit the SP-CSI report on Physical Uplink Control Channel (PUCCH) resource after a transmission of Hybrid Automatic Repeat request-Acknowledgement (HARQ-ACK) for reception of the information.

2. The terminal according to claim 1, wherein the control section assumes that there is no relation between the timing of the feedback report and the timing of the SP-CSI report, and determines the timing of the SP-CSI report, regardless of the timing of the feedback report.

3. A radio communication method for a terminal, the radio communication method comprising:
   receiving information indicating start of Semi-Persistent Channel State Information (SP-CSI) report; and
   controlling to transmit the SP-CSI report on Physical Uplink Control Channel (PUCCH) resource after a transmission of Hybrid Automatic Repeat request-Acknowledgement (HARQ-ACK) for reception of the information.

4. A base station comprising:
   a transmitting section that transmits information indicating start of Semi-Persistent Channel State Information (SP-CSI) report; and
   a control section that control to receive the SP-CSI report on Physical Uplink Control Channel (PUCCH) resource after a transmission, from the terminal, of Hybrid Automatic Repeat request-Acknowledgement (HARQ-ACK) for reception of the information.

* * * * *